(12) United States Patent
Aoki

(10) Patent No.: US 9,956,739 B2
(45) Date of Patent: May 1, 2018

(54) HONEYCOMB STRUCTURE, MANUFACTURING METHOD FOR THE SAME, AND CANNING STRUCTURE

(71) Applicant: NGK INSULATORS, LTD., Nagoya (JP)

(72) Inventor: Takashi Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 154 days.

(21) Appl. No.: 14/989,079

(22) Filed: Jan. 6, 2016

(65) Prior Publication Data

US 2016/0200067 A1 Jul. 14, 2016

(30) Foreign Application Priority Data

Jan. 13, 2015 (JP) ................................ 2015-004196

(51) Int. Cl.
| | |
|---|---|
| *B01D 50/00* | (2006.01) |
| *B01D 39/06* | (2006.01) |
| *B01D 39/14* | (2006.01) |
| *B01D 39/20* | (2006.01) |
| *B32B 3/12* | (2006.01) |
| *B01D 46/24* | (2006.01) |
| *B01D 53/88* | (2006.01) |

(Continued)

(52) U.S. Cl.
CPC .............. *B32B 3/12* (2013.01); *B01D 46/247* (2013.01); *B01D 46/2429* (2013.01); *B01D 46/2444* (2013.01); *B01D 46/2455* (2013.01); *B01D 46/2474* (2013.01); *B01D 53/885* (2013.01); *B01J 35/04* (2013.01); *B01J 37/0018* (2013.01); *B01J 37/08* (2013.01); *B28B 3/20* (2013.01); *B28B 11/08* (2013.01); *B28B 11/12* (2013.01); *B28B 11/243* (2013.01); *C04B 35/195* (2013.01); *B01D 2046/2433* (2013.01); *B01J 35/023* (2013.01); *B28B 2003/203* (2013.01); *C04B 2235/96* (2013.01); *C04B 2235/9607* (2013.01)

(58) Field of Classification Search
None
See application file for complete search history.

(56) References Cited

U.S. PATENT DOCUMENTS

| 5,188,779 A | 2/1993 | Horikawa et al. | |
|---|---|---|---|
| 7,615,273 B2 * | 11/2009 | Ichikawa | ........... B01D 46/0036 428/116 |

(Continued)

FOREIGN PATENT DOCUMENTS

| JP | 03-275309 A1 | 12/1991 |
|---|---|---|
| JP | 2002-219319 A1 | 8/2002 |

*Primary Examiner* — Amber R Orlando
(74) *Attorney, Agent, or Firm* — Burr & Brown, PLLC

(57) ABSTRACT

A honeycomb structure includes porous partition walls defining cells which extend from a first end face to a second end face and which become through channels for a fluid, and a porous circumferential wall integrally formed with the partition walls to surround an outermost circumference of the partition walls, a thickness of the partition walls is from 101 to 381 μm, porosities of the partition walls and the circumferential wall are both 48% or more, a porosity in a surface of the circumferential wall is higher than a porosity of an inner surface of the circumferential wall, and an average pore diameter in the surface of the circumferential wall is 10 μm or more.

9 Claims, 5 Drawing Sheets

(51) Int. Cl.

| | |
|---|---|
| *B01J 35/04* | (2006.01) |
| *B01J 37/08* | (2006.01) |
| *B28B 3/20* | (2006.01) |
| *B28B 11/08* | (2006.01) |
| *B28B 11/24* | (2006.01) |
| *C04B 35/195* | (2006.01) |
| *B28B 11/12* | (2006.01) |
| *B01J 37/00* | (2006.01) |
| *B01J 35/02* | (2006.01) |

(56) References Cited

U.S. PATENT DOCUMENTS

| | | | |
|---|---|---|---|
| 2003/0041574 A1 | 3/2003 | Noguchi et al. | |
| 2007/0039297 A1* | 2/2007 | Kawata | B01D 53/944 55/523 |
| 2013/0255207 A1* | 10/2013 | Izumi | B01D 46/2459 55/484 |

* cited by examiner

HONEYCOMB STRUCTURE, MANUFACTURING METHOD FOR THE SAME, AND CANNING STRUCTURE

The present application is an application based on JP 2015-004196 filed on Jan. 13, 2015 with Japan Patent Office, the entire contents of which are incorporated herein by reference.

BACKGROUND OF THE INVENTION

Field of the Invention

The present invention relates to a honeycomb structure, a manufacturing method for the honeycomb structure, and a canning structure. More particularly, it relates to a honeycomb structure which is prevented from shifting in a can body when the honeycomb structure is stored in the can body which stores the honeycomb structure, and is excellent in thermal shock resistance and is easy to be manufactured, a manufacturing method for the honeycomb structure and a canning structure in which such a honeycomb structure is stored in a can body.

Description of the Related Art

A honeycomb structure is broadly used as a filter, a catalyst carrier or the like, and is broadly used especially as a catalyst carrier, a filter or the like for exhaust gas purification or exhaust gas treatment of an internal combustion engine such as a gasoline engine or a diesel engine, or a combustion device.

In particular, for the honeycomb structure to be used in the catalyst carrier, the filter or the like for exhaust gas purification of a gasoline engine car, a diesel engine car or the like, improvement of a purification performance is required to cope with exhaust gas regulations enhanced annually due to considerations of environment problems. On the other hand, as the honeycomb structure, weight reduction is required to increase a temperature rising rate of a catalyst, thereby activating the catalyst in early stages. On the other hand, from the aspect of engine development, a tendency to orientation for low power consumption and high output is remarkably indicated, and to cope with such a situation, decrease of a pressure loss is also required for the honeycomb structure. Additionally, for the purpose of using the honeycomb structure as the filter continuously for a long period of time, it is necessary to burn and remove a particulate matter (hereinafter called "PM" sometimes) deposited in the honeycomb structure. Also from the aspect of a combustion efficiency of this particulate matter, the honeycomb structure more preferably has a lower heat capacity and the weight reduction is required. Furthermore, in a case where the honeycomb structure is used as a catalyst loading filter, it is also required to increase an amount of the catalyst to be loaded, for the improvement of the purification performance. Heretofore, such a honeycomb structure has been used in a state where the honeycomb structure is stored in a can body which stores the honeycomb structure (hereinafter referred to as "canning" sometimes).

Such a problem as mentioned above is solved by decreasing a thickness of partition walls of the honeycomb structure or increasing a porosity of a substrate. For example, as a honeycomb structure of a high porosity, there has been suggested a honeycomb structure made of a material including cordierite whose pore distribution is controlled as a main crystal phase (e.g., see Patent Document 1). Additionally, for the purpose of increasing a shape accuracy of the honeycomb structure and improving its canning properties into a can body, there is disclosed a technology of machining an outer peripheral portion of the honeycomb structure and additionally applying a circumferential coating material to form a circumferential wall (e.g., see Patent Document 2).

[Patent Document 1] JP-A-2002-219319
[Patent Document 2] JP-A-H03-275309

SUMMARY OF THE INVENTION

In a honeycomb structure of a high porosity which is described in Patent Document 1 mentioned above, a temperature rising rate can be increased, and an amount of a catalyst to be loaded onto partition walls of the honeycomb structure can be increased. However, in the honeycomb structure having thin partition walls and a substrate of the high porosity, it is difficult to acquire an isostatic strength. If the isostatic strength of the honeycomb structure is low, the honeycomb structure might be damaged by a holding pressure to be applied to a circumference of the honeycomb structure when the honeycomb structure is stored in a can body. Additionally, when the holding pressure is decreased to prevent the honeycomb structure from being damaged, there is the problem that the honeycomb structure shifts from a predetermined storage position in a case where an exhaust gas pressure or a vibration is applied to the honeycomb structure.

In addition, a honeycomb structure described in Patent Document 2 is excellent in shape accuracy, and is therefore excellent in canning properties into the can body, but there has been the problem that a thermal shock resistance is not sufficiently obtained. In particular, an exhaust gas temperature of a gasoline engine is higher than an exhaust gas temperature of a diesel engine. Therefore, in the honeycomb structure having a circumferential wall made of a circumferential coating material, there is a difference in thermal expansion coefficient between the honeycomb structure and the circumferential coating material, and hence thermal stress is generated in a boundary between the honeycomb structure and the circumferential coating material when the honeycomb structure is exposed to the exhaust gas of a high temperature, thereby causing the problem that the thermal shock resistance of the honeycomb structure is not sufficiently obtained. Additionally, in a technology described in Patent Document 2, a circumferential wall of a honeycomb formed body prepared by extrusion is ground, and then the circumferential wall made of the circumferential coating material is newly prepared, thereby causing the problem that manufacturing steps are complicated.

The present invention has been developed in view of such problems, and according to the present invention, there are provided a honeycomb structure whose partition walls are thin and in which a porosity of a substrate is high and which is hard to shift in a can body and is excellent in thermal shock resistance, and a manufacturing method for the honeycomb structure. In addition, according to the present invention, there is provided a canning structure in which such a honeycomb structure as mentioned above is used.

According to the present invention, there are provided a honeycomb structure, a manufacturing method for the honeycomb structure, and a canning structure as follows.

[1] A honeycomb structure including porous partition walls defining cells which extend from a first end face to a second end face and which become through channels for a fluid; and a porous circumferential wall integrally formed with the partition walls to surround an outermost circumference of the partition walls, wherein a thickness of the partition walls is from 101 to 381 μm, porosities of the partition walls and the circumferential wall are both 48% or more, a porosity in a surface of the circumferential wall is higher than a porosity of an inner surface of the circumferential wall, and an average pore diameter in the surface of the circumferential wall is 10 µm or more.

[2] The honeycomb structure according to the above [1], wherein a cell density of the cells defined by the partition walls is from 15 to 62 cells/cm$^2$.

[3] The honeycomb structure according to the above [1] or [2], wherein the porosities of the partition walls and the circumferential wall are both from 48 to 75%.

[4] The honeycomb structure according to any one of the above [1] to [3], wherein the average pore diameter in the surface of the circumferential wall is from 10 to 30 µm.

[5] The honeycomb structure according to any one of the above [1] to [4], wherein in an end portion of each of the cells on the side of the first end face or the second end face, a plugging member which plugs an open end of the cell is disposed.

[6] The honeycomb structure according to any one of the above [1] to [5], wherein an outer diameter dimensional difference of the honeycomb structure is within ±0.5 mm.

[7] A method of manufacturing the honeycomb structure according to any one of the above [1] to [6], including a honeycomb formed body preparing step A1 of extruding a kneaded material obtained by kneading a forming raw material in the form of a honeycomb, to obtain a honeycomb formed body having partition walls defining cells which extend from a first end face to a second end face, and a circumferential wall formed to surround an outermost circumference of the partition walls; a formed body grinding step A2 of grinding the surface of the circumferential wall of the obtained honeycomb formed body; and a firing step A3 of firing the honeycomb formed body in which the surface of the circumferential wall is ground, to obtain the honeycomb structure.

[8] A method of manufacturing the honeycomb structure according to any one of the above [1] to [6], including a honeycomb formed body preparing step B1 of extruding a kneaded material obtained by kneading a forming raw material in the form of a honeycomb, to obtain a honeycomb formed body having partition walls defining cells which extend from a first end face to a second end face, and a circumferential wall formed to surround an outermost circumference of the partition walls; a firing step B2 of firing the obtained honeycomb formed body to obtain a honeycomb fired body; and a fired body grinding step B3 of grinding the surface of the circumferential wall of the obtained honeycomb fired body.

[9] A canning structure including the honeycomb structure according to any one of the above [1] to [6]; a can body which stores the honeycomb structure; and a cushioning member interposed between the honeycomb structure and the can body, wherein in a direction orthogonal to a cell extending direction of the honeycomb structure, a holding pressure to be applied to the circumferential wall is 0.2 MPa or more and 1.0 MPa or less.

In a honeycomb structure of the present invention, a thickness of partition walls is from 101 to 381 µm, and porosities of the partition walls and a circumferential wall are both 48% or more. Furthermore, in the honeycomb structure of the present invention, a porosity in a surface of the circumferential wall is higher than a porosity of an inner surface of the circumferential wall, and an average pore diameter in the surface of the circumferential wall is 10 µm or more. In the honeycomb structure of the present invention constituted in this way, as compared with a conventional honeycomb structure, a surface roughness in the surface of the circumferential wall is rougher, and a friction coefficient of the surface of the circumferential wall is larger. In consequence, when the honeycomb structure is stored in a can body, shift of the honeycomb structure in the can body can effectively be inhibited even with a holding pressure smaller than before.

In the honeycomb structure of the present invention, the thickness of the partition walls is from 101 to 381 µm, and hence the thickness of the partition walls is comparatively small in the honeycomb structure. Additionally, in the honeycomb structure of the present invention, the porosities of the partition walls and the circumferential wall are 48% or more, and hence the honeycomb structure has a comparatively high porosity. In a conventional honeycomb structure of the high porosity, as compared with a honeycomb structure of a low porosity in which the porosity is smaller than 48%, an isostatic strength is lower, and it is difficult to store the honeycomb structure with a high holding pressure in a case where the honeycomb structure is stored in the can body. When the conventional honeycomb structure of the high porosity is stored in the can body with a low holding pressure, the honeycomb structure might shift in the can body. In the honeycomb structure of the present invention, the shift of the honeycomb structure in the can body can effectively be inhibited even with the small holding pressure as described above, and hence the honeycomb structure is suitably utilizable as a catalyst carrier, a filter or the like for exhaust gas purification. Additionally, in the honeycomb structure of the present invention, the partition walls are formed integrally with the circumferential wall, and hence the honeycomb structure is excellent in thermal shock resistance.

Additionally, according to a manufacturing method for the honeycomb structure of the present invention, the above-mentioned honeycomb structure can be manufactured by a remarkably simple method.

A calming structure of the present invention is such a honeycomb structure as mentioned above that is canned in the can body. The porosity of the partition walls of the honeycomb structure is high, and hence in a case where a catalyst is applied into the partition walls, a pressure loss is further low. Additionally, a heat capacity of the honeycomb structure is small, and hence the time required to activate the catalyst can be shortened. In addition, the canning structure of the present invention is excellent in thermal shock resistance, because a circumferential coating material is not used in the circumferential wall. Furthermore, the canning structure of the present invention can effectively inhibit the honeycomb structure from shifting in the can body.

DESCRIPTION OF THE PREFERRED EMBODIMENTS

Hereinafter, embodiments of the present invention will be described, but the present invention is not limited to the following embodiments. Therefore, it should be understood that the following embodiments, to which changes, improvements and the like are suitably added on the basis of ordinary knowledge of a person skilled in the art without departing from the gist of the invention, also enter the scope of the present invention.

Figure 1:
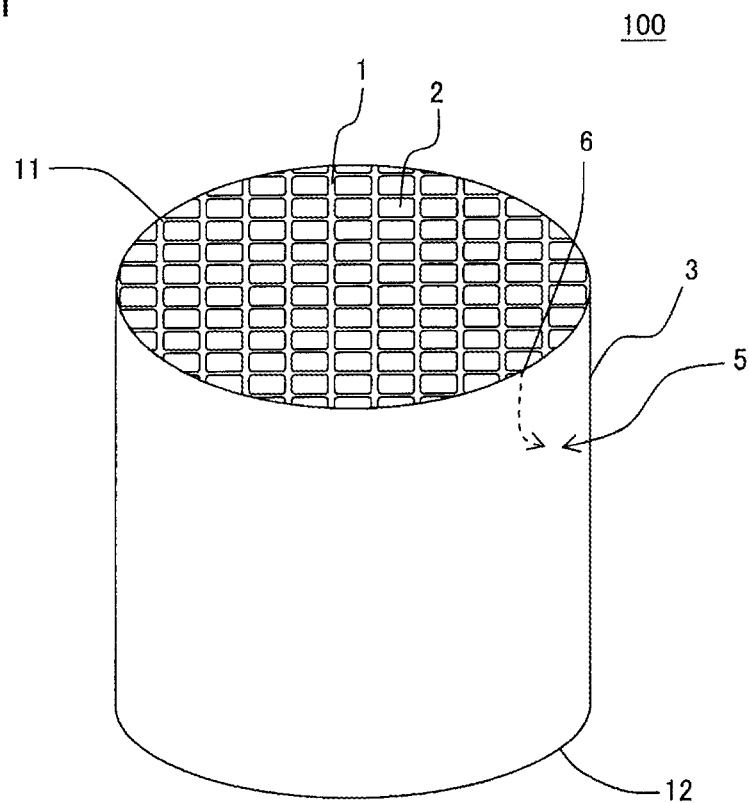
FIG. 1 is a perspective view schematically showing a first embodiment of a honeycomb structure of the present invention seen from a first end face side.
Figure 2:
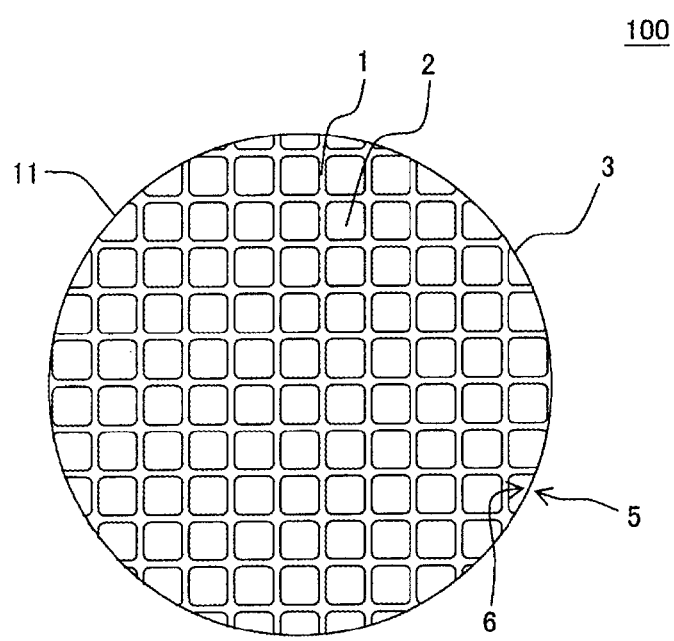
FIG. 2 is a plan view in which the honeycomb structure shown in FIG. 1 is seen from the first end face side.
Figure 3:
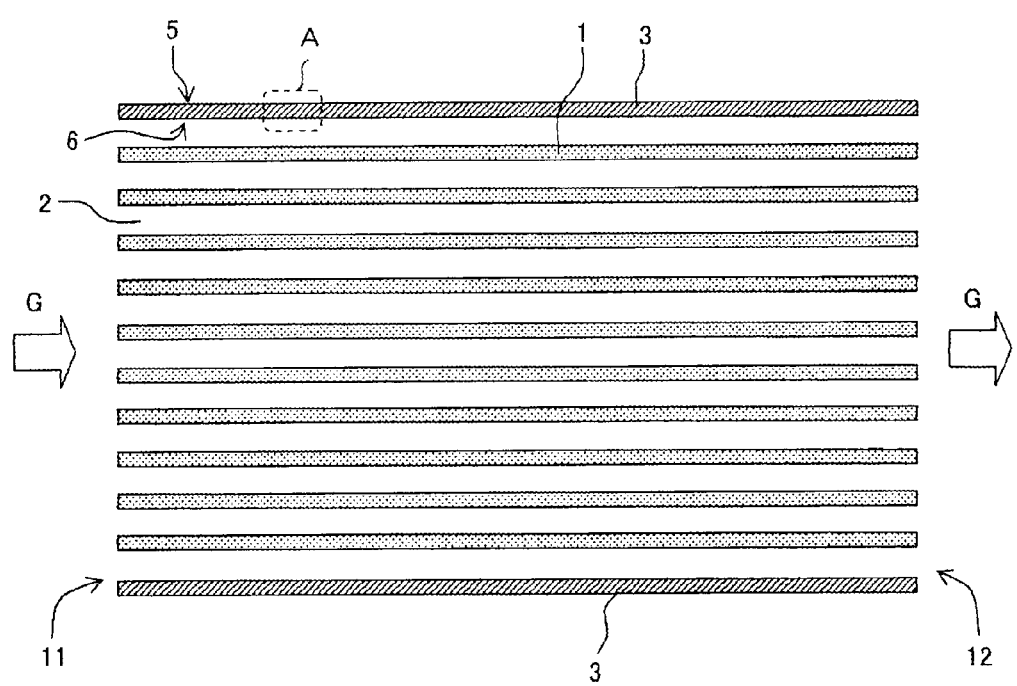
FIG. 3 is a cross-sectional view schematically showing a cross section of the honeycomb structure shown in FIG. 1 which is parallel to a cell extending direction of the honeycomb structure.
Figure 4:
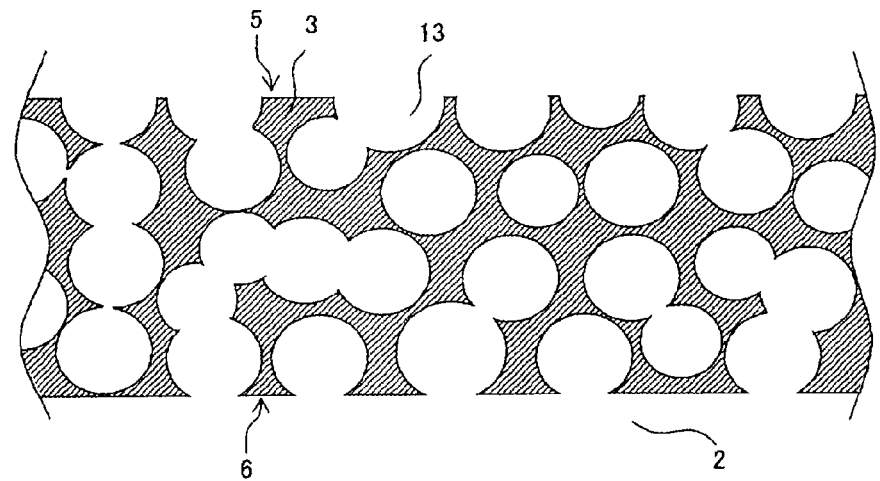
FIG. 4 is an enlarged cross-sectional view schematically showing a range surrounded with a broken line A of FIG. 3.

(1) Honeycomb Structure:

A first embodiment of a honeycomb structure of the present invention is such a honeycomb structure 100 as shown in FIG. 1 to FIG. 4. The honeycomb structure 100 includes porous partition walls 1 defining cells 2 which extend from a first end face 11 to a second end face 12 and which become through channels for a fluid, and a porous circumferential wall 3 integrally formed with the partition walls 1 to surround an outermost circumference of the partition walls 1. Here, FIG. 1 is a perspective view schematically showing the first embodiment of the honeycomb structure of the present invention seen from a first end face side. FIG. 2 is a plan view of the honeycomb structure shown in FIG. 1 and seen from the first end face side. FIG. 3 is a cross-sectional view schematically showing a cross section of the honeycomb structure shown in FIG. 1 which is parallel to a cell extending direction of the honeycomb structure. FIG. 4 is an enlarged cross-sectional view schematically showing a range surrounded with a broken line A of FIG. 3. In FIG. 3, reference sign G indicates an exhaust gas.

In the honeycomb structure 100 of the present embodiment, a thickness of the partition walls 1 is from 101 to 381 μm, and porosities of the partition walls 1 and the circumferential wall 3 are both 48% or more. Additionally, in the honeycomb structure 100 of the present embodiment, a porosity in a surface 5 of the circumferential wall 3 is higher than a porosity of an inner surface 6 of the circumferential wall 3, and an average pore diameter in the surface 5 of the circumferential wall 3 is 10 μm or more. In the honeycomb structure 100 constituted in this manner, as compared with a conventional honeycomb structure, a surface roughness in the surface 5 of the circumferential wall 3 is rougher, and a friction coefficient of the surface 5 of the circumferential wall 3 is larger. In consequence, when the honeycomb structure 100 is stored in a can body, shift of the honeycomb structure 100 in the can body can effectively be inhibited even with a holding pressure smaller than before. Here, the surface 5 of the circumferential wall 3 means an outer surface (a circumferential surface) in the circumferential wall 3 disposed to surround the partition walls 1. The inner surface 6 of the circumferential wall 3 means an inner surface (an inner peripheral surface) in the circumferential wall 3 disposed to surround the partition walls 1.

In the honeycomb structure 100 of the present embodiment, the thickness of the partition walls 1 is from 101 to 381 μm, and hence the thickness of the partition walls 1 is comparatively small in the honeycomb structure 100. Additionally, in the honeycomb structure 100 of the present embodiment, the porosities of the partition walls 1 and the circumferential wall 3 are 48% or more, and hence the honeycomb structure 100 has a comparatively high porosity. In the conventional honeycomb structure of a high porosity, as compared with a honeycomb structure of a low porosity in which the porosity is smaller than 48%, an isostatic strength is lower, and it is difficult to store the honeycomb structure with a high holding pressure in a case where the honeycomb structure is stored in the can body. When the conventional honeycomb structure of the high porosity is stored in the can body with a low holding pressure, the honeycomb structure might shift in the can body. In the honeycomb structure 100 of the present embodiment, the shift of the honeycomb structure 100 in the can body can effectively be inhibited even with the small holding pressure as described above, and hence the honeycomb structure is suitably utilizable as a catalyst carrier, a filter or the like for exhaust gas purification. Additionally, in the honeycomb structure 100 of the present embodiment, the partition walls 1 are formed integrally with the circumferential wall 3, and hence the honeycomb structure is excellent in thermal shock resistance.

Here, when "the partition walls 1 are formed integrally with the circumferential wall 3", it is meant that a forming raw material is extruded, thereby integrally forming the partition walls 1 and the circumferential wall 3. The forming raw material is a raw material to form the partition walls 1 and the circumferential wall 3. The honeycomb structure 100 is constituted so that there is not a joint between the partition wall 1 and the circumferential wall 3, and a thermal expansion coefficient of the partition walls 1 and a thermal expansion coefficient of the circumferential wall 3 are remarkably close values (or the same value). In consequence, the honeycomb structure 100 of the present embodiment is for use as the filter for exhaust gas purification, and even in a situation where the high-temperature exhaust gas flows, damages are hard to occur in the partition walls 1 and the circumferential wall 3. On the other hand, when the circumferential wall or the like of the honeycomb structure is coated with a circumferential coating material or the like, a remarkable difference might be made between both the thermal expansion coefficients even in a case where the circumferential wall or the like is made of the same material as the circumferential coating material. Hereinafter, the honeycomb structure in which the circumferential wall made of the circumferential coating material is formed will be referred to as "a circumferential coating honeycomb structure" sometimes. In particular, when the circumferential coating honeycomb structure is used as the filter for exhaust gas purification through which the high-temperature exhaust gas flows, the thermal shock resistance of the circumferential coating honeycomb structure might not sufficiently be obtained due to the difference in thermal expansion coefficient between the members. For example, in the circumferential coating honeycomb structure obtained by extruding a cordierite forming raw material and applying the circumferential coating material of cordierite, the difference in thermal expansion coefficient is made for the following reason. When kaolinite as hexagonal plate-like crystals in the cordierite forming raw material passes through a die for extrusion, the crystals are aligned along a plane of each partition wall. Afterward, in a firing process, hexagonal prismatic columnar cordierite crystals are generated at right angles to the crystals of kaolin, and hence the honeycomb structure is formed so that a c-axis direction of the cordierite crystals is parallel to the partition wall plane of the honeycomb structure. The thermal expansion coefficient of the cordierite crystals has an anisotropy, and hence the thermal expansion coefficient of the honeycomb structure obtained by extruding the cordierite forming raw material and then performing the firing process is different from the thermal expansion coefficient of cordierite in a state where the crystals are not aligned. Therefore, in the circumferential coating honeycomb structure further having the cordierite circumferential wall which is applied as the circumferential coating material to the extruded cordierite honeycomb structure, the thermal shock resistance might be low.

In the honeycomb structure 100 of the present embodiment, the thickness of the partition walls 1 is from 101 to 381 μm. When the thickness of the partition walls 1 is smaller than 101 μm, the die is clogged with the forming raw material and hence the partition walls 1 cannot be formed well, in the case where the forming raw material is extruded. It is to be noted that when the thickness of the partition walls 1 is in excess of 305 μm, a pressure loss might increase, thereby causing output decrease of an engine or deterioration of a fuel efficiency. The thickness of the partition walls 1 is a value measured by a method in which a cross section orthogonal to an extending direction of the cells 2 of the honeycomb structure 100 is observed with an optical microscope. The thickness of the partition walls 1 is from 101 to 381 μm, but is preferably from 127 to 330 μm, and further preferably from 152 to 305 μm.

Figure 5:
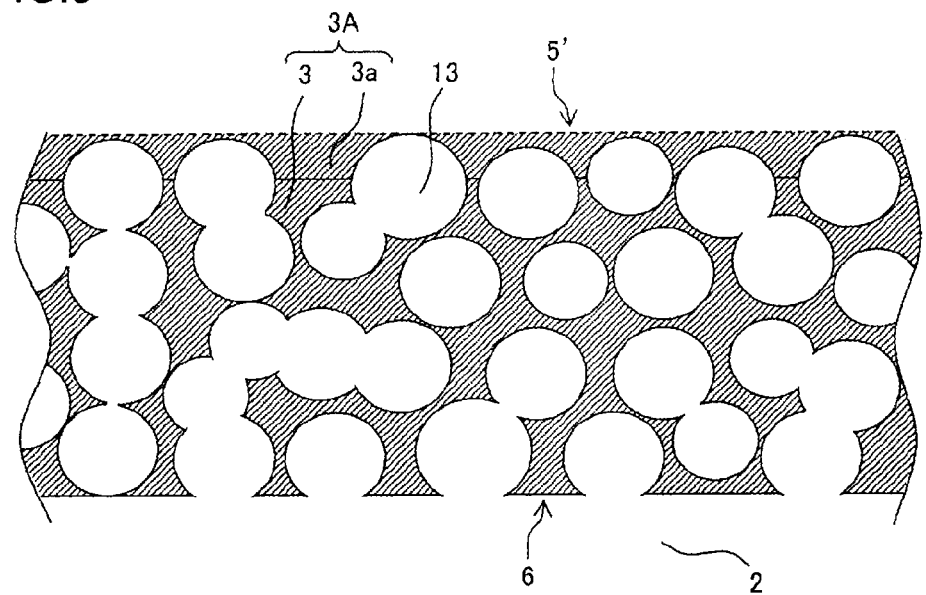
FIG. 5 is an enlarged cross-sectional view schematically showing a cross section of a circumferential wall prepared in a manufacturing process of the first embodiment of the honeycomb structure of the present invention.
Figure 6:
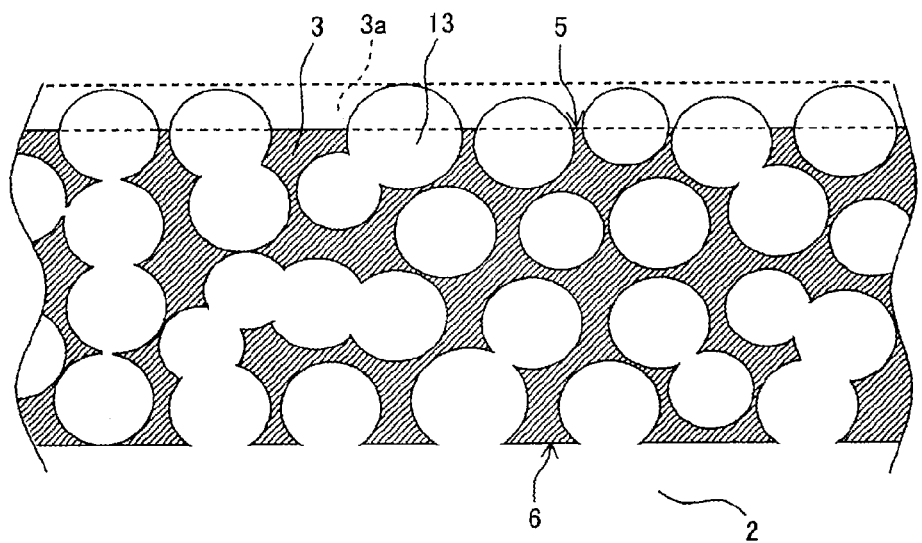
FIG. 6 is an enlarged cross-sectional view showing a state after the circumferential wall shown in FIG. 5 is ground.

In the honeycomb structure 100 of the present embodiment, the porosities of the partition walls 1 and the circumferential wall 3 are both 48% or more. The porosities of the partition walls 1 and circumferential wall 3 which are integrally formed indicate about the same degree of value. When the porosities of the partition walls 1 and the circumferential wall 3 are smaller than 48%, it is difficult to manufacture the honeycomb structure 100 in which the porosity in the surface 5 of the circumferential wall 3 is higher than the porosity of the inner surface 6 of the circumferential wall 3. In other words, it might be difficult to prepare the circumferential wall 3 in which the friction coefficient of the surface 5 is large. As shown in, for example, FIG. 5 and FIG. 6, the honeycomb structure 100 of the present embodiment can be manufactured by grinding a surface 5' of a circumferential wall 3A which has not been ground yet and adjusting the porosity in the surface 5 of the circumferential wall 3 which has been ground so that the porosity is higher than the porosity of the inner surface 6 of the circumferential wall 3. That is, as shown in FIG. 5, in the honeycomb structure manufactured by extruding the forming raw material, pores 13 whose pore diameters are large might not remarkably be formed in the surface 5' of the circumferential wall 3A which has not been ground. In particular, the honeycomb structure manufactured by using the forming raw material including a pore former remarkably has this tendency. Here, FIG. 5 is an enlarged cross-sectional view schematically showing a cross section of the circumferential wall prepared in a manufacturing process of the first embodiment of the honeycomb structure of the present invention. FIG. 6 is an enlarged cross-sectional view showing a state after the circumferential wall shown in FIG. 5 is ground. It is to be noted that FIG. 5 and FIG. 6 show the circumferential wall of the honeycomb structure manufactured by using the forming raw material including the pore former, and the enlarged cross-sectional view shown in FIG. 5 indicates a state before the circumferential wall is ground.

Figure 7:
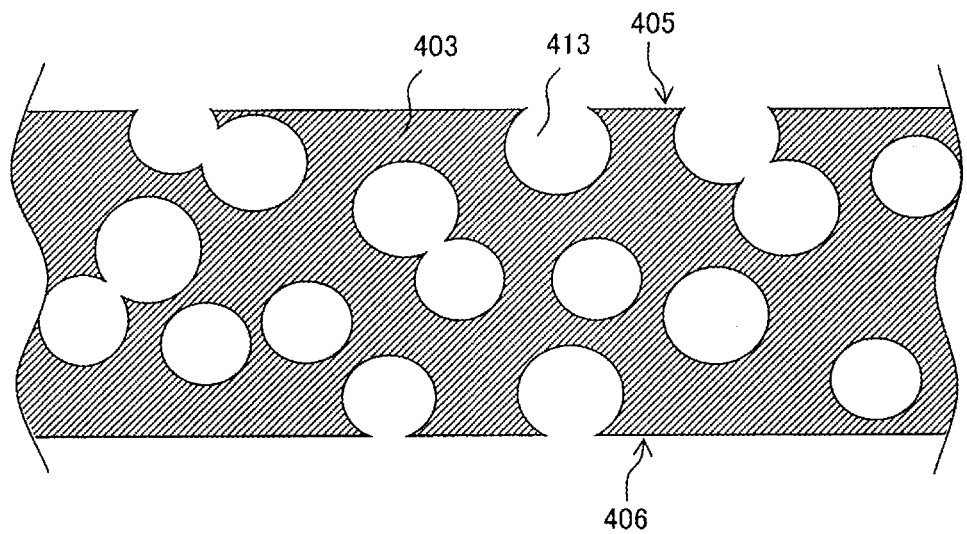
FIG. 7 is an enlarged cross-sectional view schematically showing a cross section of a circumferential wall which is parallel to a cell extending direction of a conventional honeycomb structure.

As to the circumferential wall 3A shown in FIG. 5, the porosity in the surface 5' of the circumferential wall 3A is usually lower than the porosity in the circumferential wall 3A (i.e., the porosity of the circumferential wall 3A). When the honeycomb structure of the present embodiment is manufactured, an exterior covering portion 3a of a predetermined range is ground from the surface 5' of the circumferential wall 3A shown in FIG. 5. In consequence, the circumferential wall 3 shown in FIG. 6 is formed. In the circumferential wall 3 shown in FIG. 6, the exterior covering portion 3a (see FIG. 5) of the circumferential wall 3A (see FIG. 5) shown in FIG. 5 is removed by the grinding, and the pores 13 having large pore diameters are formed in the surface 5. In this way, it is possible to manufacture the honeycomb structure in which the porosity in the surface 5 of the circumferential wall 3 is higher than the porosity of the inner surface 6 of the circumferential wall 3 and the average pore diameter in the surface 5 of the circumferential wall 3 is 10 μm or more. In the honeycomb structure manufactured in this way, the surface roughness in the surface 5 of the circumferential wall 3 is rough, the friction coefficient of the surface 5 of the circumferential wall 3 is large, and the shift of the honeycomb structure in the can body can effectively be inhibited even with a small holding pressure. However, in a case where the porosities of the partition walls 1 and the circumferential wall 3 are both smaller than 48%, an effect of inhibiting the shift of the honeycomb structure in the can body is not sufficiently developed even when the exterior covering portion of the circumferential wall is removed by the grinding as described above. Here, FIG. 7 is an enlarged cross-sectional view schematically showing a cross section of a circumferential wall which is parallel to a cell extending direction of the conventional honeycomb structure. A porosity of a circumferential wall 403 shown in FIG. 7 is smaller than 48%. Further, pores 413 formed in the circumferential wall 403 are very sparsely present as compared with the pores 13 formed in the circumferential wall 3 shown in FIG. 5 and FIG. 6. In the circumferential wall 403 of a low porosity in which the porosity is smaller than 48% as shown in FIG. 7, even when an exterior covering portion of the circumferential wall 403 is ground, a surface roughness in a surface 405 of the circumferential wall 403 is not sufficiently rough, and a friction coefficient of the surface 405 of the circumferential wall 403 is hard to increase. Therefore, in the circumferential wall 403 of such a low porosity, an effect of inhibiting shift of the honeycomb structure in a can body even with a small holding pressure is not sufficiently developed. Additionally, in the circumferential wall 403 of the low porosity, an isostatic strength tends to be higher than in a circumferential wall of a high porosity, and it is also considered that it is originally less required to decrease the holding pressure. In FIG. 7, reference numeral 406 indicates an inner surface of the circumferential wall 403.

In the honeycomb structure of the present embodiment, the porosities of the partition walls and the circumferential wall are both 48% or more, and the decrease of the pressure loss is achieved. Additionally, the porosities of the partition walls and the circumferential wall are both 48% or more, and hence a temperature rising rate of the honeycomb structure is high, and the time required to activate a catalyst can be shortened. Furthermore, when the honeycomb structure of the present embodiment is used as a catalyst loading filter, an amount of the catalyst to be loaded per unit volume can be increased. The porosities of the partition walls and the circumferential wall are both preferably from 48 to 75%, further preferably from 50 to 75%, and especially preferably from 55 to 75%. When the porosities of the partition walls and the circumferential wall are both in excess of 75%, mechanical strengths of the partition walls and the circumferential wall might be excessively low. The porosities of the partition walls and the circumferential wall are values measured by mercury porosimetry.

In the honeycomb structure of the present embodiment, the porosity in the surface of the circumferential wall is higher than the porosity of the inner surface of the circumferential wall. The porosity in the surface of the circumferential wall is higher than the porosity of the inner surface of the circumferential wall, and hence the friction coefficient of the surface of the circumferential wall increases. Furthermore, the shift of the honeycomb structure in the can body can effectively be inhibited even with the small holding pressure. The porosity in the surface of the circumferential wall and the porosity of the inner surface of the circumferential wall are values measured by image analysis. For example, the porosity in the surface of the circumferential wall can be measured by such a method as mentioned below. By a scanning electron microscope (SEM), SEM photographs of the surface of the circumferential wall are optionally photographed in a plurality of view fields. The number of the view fields to be photographed is at least 2. A size of one view field to be photographed is set to 1.3 mm×1.0 mm. Next, each photographed image is binarized by the image analysis, and divided into a hollow portion (i.e., a pore portion) and a portion other than hollows. Next, ratios occupied by the hollow portions in the respective images are calculated, and an average value is obtained. In this manner, the porosity in the surface of the circumferential wall is calculated. On the other hand, the porosity of the inner surface of the circumferential wall can be measured by such a method as mentioned below. First, an outer wall peripheral portion is cut from the honeycomb structure, and then the partition walls which come in contact with the circumferential wall are removed to expose the inner surface of the circumferential wall. Next, by the scanning electron microscope (SEM), SEM photographs of the inner surface of this circumferential wall are optionally photographed in a plurality of view fields. A method of photographing the view fields and the subsequent method of calculating the porosity can be performed similarly to the case where the porosity in the surface of the circumferential wall is calculated, but when the porosity is calculated, a portion which comes in contact with the partition walls is removed to calculate the porosity.

When the porosity in the surface of the circumferential wall is defined as "P1" and the porosity of the inner surface of the circumferential wall is defined as "P2", a value of P1/P2 is preferably from 1.1 to 2.1, further preferably from 1.3 to 2.1, and especially preferably from 1.5 to 2.1. When the value of P1/P2 is smaller than 1.1, a difference between the porosity P1 in the surface of the circumferential wall and the porosity P2 of the inner surface of the circumferential wall is excessively small, and hence an effect of increasing the friction coefficient of the surface of the circumferential wall might not sufficiently be exerted. On the other hand, there is not any special restriction on an upper limit value of the value of P1/P2, but in the case where the porosities of the partition walls and the circumferential wall are 48% or more, the upper limit value is substantially 2.1.

In the honeycomb structure of the present embodiment, the average pore diameter in the surface of the circumferential wall is 10 µm or more. When the average pore diameter in the surface of the circumferential wall is smaller than 10 µm, the surface roughness in the surface of the circumferential wall is not sufficiently rough, and the friction coefficient of the surface of the circumferential wall is hard to increase. The average pore diameter in the surface of the circumferential wall is preferably from 10 to 30 µM, further preferably from 11 to 27 µm, and especially preferably from 12 to 25 µm. When the average pore diameter in the surface of the circumferential wall is in excess of 30 µm, the catalyst might leak out from the circumferential wall in a step of loading the catalyst. The average pore diameter in the surface of the circumferential wall is a value obtained by analyzing the SEM photograph binarized by image processing.

In the honeycomb structure of the present embodiment, a cell density of the cells defined by the partition walls is preferably from 15 to 62 cells/cm$^2$ and further preferably from 23 to 56 cells/cm$^2$. According to such a constitution, the honeycomb structure of the present embodiment is suitably utilizable as the catalyst carrier, the filter or the like for exhaust gas purification.

A thickness of the circumferential wall in a cross section orthogonal to the cell extending direction of the honeycomb structure is preferably from 0.2 to 5.0 mm, further preferably from 0.3 to 4.0 mm, and especially preferably from 0.4 to 3.0 mm. When the thickness of the circumferential wall is smaller than 0.2 mm, the mechanical strength of the circumferential wall might decrease. When the thickness of the circumferential wall is larger than 5.0 mm, a large space has to be acquired to store the honeycomb structure.

There is not any special restriction on a shape of each cell of the honeycomb structure. In the cross section orthogonal to the cell extending direction, the shape of the cell is preferably a polygonal shape such as a triangular, quadrangular, pentangular, hexagonal or octagonal shape, a round shape, or an elliptic shape, or may be another intermediate shape. Hereinafter, the shape of the cell in the cross section orthogonal to the cell extending direction will be referred to "the shape of the cells" or "the cell shape" sometimes.

There is not any special restriction on a shape of the honeycomb structure, but the shape is preferably a round pillar shape, a pillar shape whose bottom surface is elliptic, a pillar shape whose bottom surface has a polygonal shape such as a quadrangular, pentangular or hexagonal shape, or the like. In the honeycomb structure, the circumferential wall is disposed to surround the outermost circumference of the partition walls, and hence a circumferential shape of the honeycomb structure is the shape of the circumferential wall. The shape of the honeycomb structure of the present embodiment is more preferably a round pillar shape, and an outer diameter dimensional difference of the honeycomb structure is especially preferably within ±0.5 mm. As described above, the honeycomb structure of the present embodiment can be prepared by removing the exterior covering portion of the circumferential wall by the grinding so that more pores appear in the surface of the circumferential wall. Consequently, in the above grinding, processing is performed to further decrease the outer diameter dimensional difference of the honeycomb structure, and hence it is possible to prepare the honeycomb structure excellent in cylindricity.

There is not any special restriction on a size of the honeycomb structure, but a length of the honeycomb structure in the cell extending direction is preferably from 50 to 356 mm. The length of the honeycomb structure is in such a range, and hence by the honeycomb structure, the exhaust gas can be treated with an excellent trapping performance without increasing the pressure loss. When the length is smaller than 50 mm, the trapping performance might deteriorate. Additionally, when the length is larger than 356 mm, improvement of the trapping performance cannot be expected so much, and the pressure loss might rather increase. When a balance between the trapping performance and the pressure loss is considered, the length of the honeycomb structure is further preferably from 50 to 330 mm and especially preferably from 50 to 305 mm Additionally, for example, in a case where the honeycomb structure has the round pillar shape, a diameter of its end face is preferably from 50 to 356 mm. The diameter of the end face of the honeycomb structure is suitably selected from the above range in accordance with engine displacement or output in a case where a use application of the honeycomb structure is, for example, the catalyst carrier, the filter or the like for exhaust gas purification.

The partition walls and the circumferential wall of the honeycomb structure preferably include a ceramic material as a main component. Specifically, a material of the partition walls and the circumferential wall is preferably at least one selected from the group consisting of cordierite, mullite, alumina, spinel, silicon carbide, a silicon-silicon carbide based composite material, a silicon carbide-cordierite based composite material, lithium aluminum silicate, and aluminum titanate. Among these materials, cordierite excellent in thermal shock resistance is preferable. Additionally, when "the ceramic material is included as the main component", it is meant that 90 mass % or more of the ceramic material is contained in the whole material.

In the honeycomb structure of the present embodiment, the catalyst, e.g., an oxidation catalyst may be loaded onto at least part of the partition walls. In more detail, the catalyst is preferably loaded onto the partition walls constituting the honeycomb structure. The amount of the catalyst to be loaded per unit volume of the honeycomb structure is preferably from 10 to 300 g/liter, further preferably from 10 to 250 g/liter, and especially preferably from 10 to 200 g/liter. When the amount is smaller than 10 g/liter, a catalyst effect might be hard to be exerted. When the amount is larger than 300 g/liter, the pores of the partition walls are closed, the pressure loss therefore increases, and a trapping efficiency might remarkably deteriorate.

In the case where the catalyst is loaded onto the honeycomb structure of the present embodiment, the catalyst preferably includes one or more selected from the group consisting of a three-way catalyst, an SCR catalyst, a NO absorber catalyst, and the oxidation catalyst. The three-way catalyst is a catalyst which mainly purifies hydrocarbon (HC), carbon monoxide (CO), and nitrogen oxides ($NO_x$). An example of the three-way catalyst is a catalyst including platinum (Pt), palladium (Pd), and rhodium (Rh). The SCR catalyst is a catalyst which selectively reduces a component to be purified. Especially, in the honeycomb structure of the present embodiment, the SCR catalyst is preferably an SCR catalyst for NO selective reduction which selectively reduces NO in the exhaust gas. An example of the SCR catalyst for NO selective reduction is preferably a catalyst which selectively reduces and purifies NO in the exhaust gas. Additionally, an example of the SCR catalyst is a metal-substituted zeolite. Examples of the metal to be metal-substituted for a zeolite include iron (Fe) and copper (Cu). An example of the zeolite is preferably a beta zeolite. Additionally, the SCR catalyst may be a catalyst containing at least one selected from the group consisting of vanadium and titania as a main component. Examples of the NO absorber catalyst include an alkali metal and/or an alkali earth metal. Examples of the alkali metal include potassium, sodium, and lithium. An example of the alkali earth metal is calcium or like. An example of the oxidation catalyst is a catalyst containing a noble metal. Specifically, the oxidation catalyst preferably contains at least one selected from the group consisting of platinum, palladium and rhodium.

Figure 8:
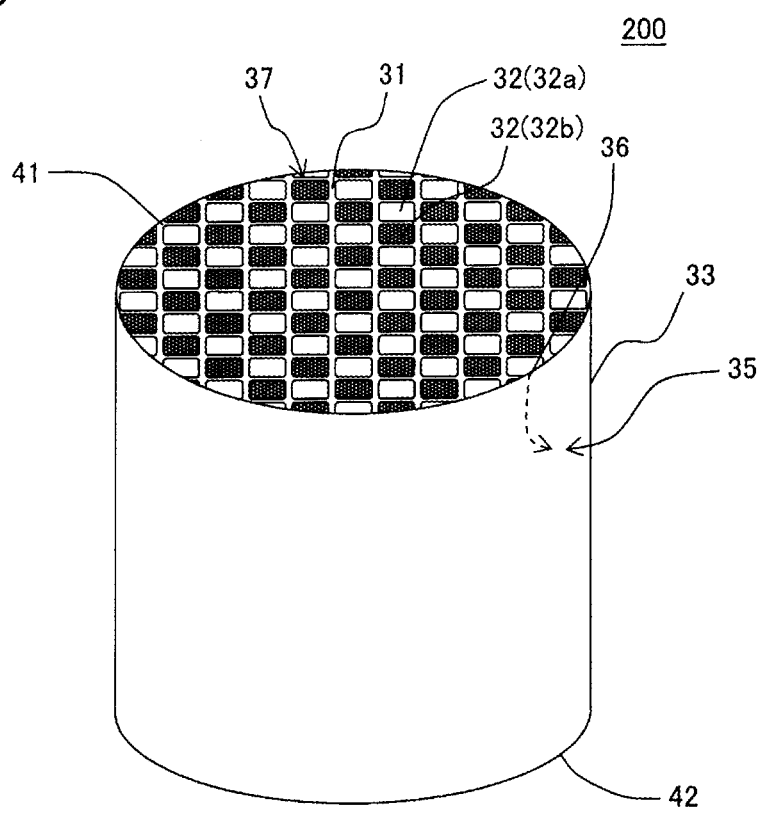
FIG. 8 is a perspective view schematically showing a second embodiment of the honeycomb structure of the present invention seen from a first end face side.
Figure 9:
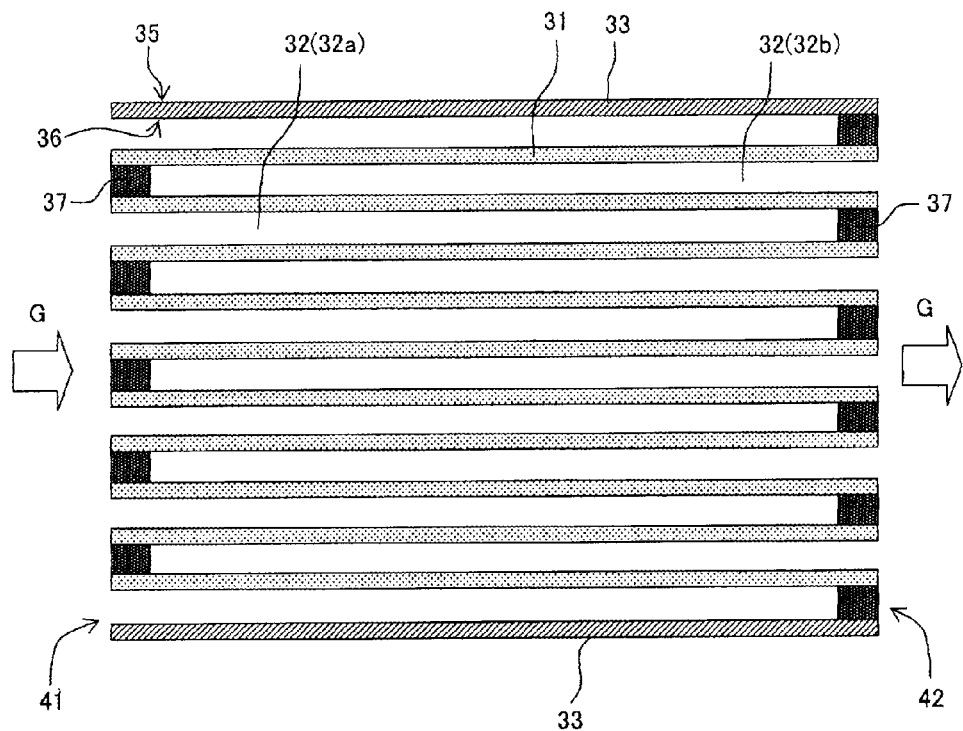
FIG. 9 is a cross-sectional view schematically showing a cross section of the honeycomb structure shown in FIG. 8 which is parallel to a cell extending direction of the honeycomb structure.

Here, a second embodiment of the honeycomb structure of the present invention will be described. Here, FIG. 8 is a perspective view schematically showing the second embodiment of the honeycomb structure of the present invention seen from a first end face side. FIG. 9 is a cross-sectional view schematically showing a cross section of the honeycomb structure shown in FIG. 8 which is parallel to a cell extending direction of the honeycomb structure. As shown in FIG. 8 and FIG. 9, a honeycomb structure 200 of the present embodiment includes porous partition walls 31 defining cells 32 which extend from a first end face 41 to a second end face 42 and which become through channels for a fluid, and a porous circumferential wall 33 integrally formed with the partition walls 31 to surround an outermost circumference of the partition walls 31. In the honeycomb structure 200, a plugging member 37 which plugs an open end of the cell 32 is disposed in an end portion of the cell 32 on a first end face 41 side or a second end face 42 side. In the honeycomb structure 200 of the present embodiment, a thickness of the partition walls 31 is from 101 to 381 μm, and porosities of the partition walls 31 and the circumferential wall 33 are both 48% or more. Additionally, in the honeycomb structure 200 of the present embodiment, a porosity in a surface 35 of the circumferential wall 33 is higher than a porosity of an inner surface 36 of the circumferential wall 33, and an average pore diameter in the surface 35 of the circumferential wall 33 is 10 μm or more. The partition walls 31 and the circumferential wall 33 of the honeycomb structure 200 are preferably constituted similarly to the partition walls and the circumferential wall of the honeycomb structure of the abovementioned first embodiment. The honeycomb structure 200 constituted in this way has an operation and an effect similar to those of the honeycomb structure of the first embodiment. In FIG. 9, reference sign G indicates an exhaust gas.

In the honeycomb structure 200 of the present embodiment, predetermined cells 32b in which the plugging members 37 are disposed on the first end face 41 side and residual cells 32a in which the plugging members 37 are disposed on the second end face 42 side are preferably arranged in a zigzag manner. There is not any special restriction on a material of the plugging members 37, but the material preferably includes a ceramic material as a main component. The material of the plugging members 37 may be the same as the material of the partition walls 31 and the circumferential wall 33 of the honeycomb structure 200 or different therefrom.

(2) Manufacturing Method 1 for Honeycomb Structure:

Next, one embodiment of a manufacturing method for a honeycomb structure of the present invention will be described. The manufacturing method for the honeycomb structure of the present embodiment is a method for manufacturing the honeycomb structure 100 shown in FIG. 1 to FIG. 3 or the honeycomb structure 200 shown in FIG. 8 described above. The manufacturing method for the honeycomb structure of the present embodiment includes a honeycomb formed body preparing step A1, a formed body grinding step A2, and a firing step A3 which will be mentioned below.

(2-1) Honeycomb Formed Body Preparing Step A1:

The honeycomb formed body preparing step A1 is a step of extruding a kneaded material obtained by kneading a forming raw material in the form of a honeycomb to obtain a honeycomb formed body. The honeycomb formed body has partition walls defining cells which extend from a first end face to a second end face, and a circumferential wall formed to surround an outermost circumference of the partition walls. Specifically, the forming raw material is first kneaded to obtain the kneaded material. Next, the obtained kneaded material is extruded to obtain the honeycomb formed body in which the partition walls and the circumferential wall are integrally formed.

The forming raw material is preferably obtained by adding a dispersing medium and an additive to a ceramic raw material. Examples of the additive include an organic binder, a pore former, and a surfactant. An example of the dispersing medium is water or like.

The ceramic raw material is preferably at least one selected from the group consisting of a cordierite forming raw material, mullite, alumina, spinel, silicon carbide, a silicon-silicon carbide based composite material, a silicon carbide-cordierite based composite material, lithium aluminum silicate, and aluminum titanate. Among these materials, the cordierite forming raw material is preferable which has a small thermal expansion coefficient and is excellent in thermal shock resistance.

Examples of the organic binder include methylcellulose, hydroxypropyl cellulose, hydroxyethylcellulose, carboxymethylcellulose, and polyvinyl alcohol. Among these binders, methylcellulose is preferably used together with hydroxypropoxyl cellulose. A content of the organic binder is preferably from 5 to 25 parts by mass to 100 parts by mass of the ceramic raw material.

There is not any special restriction on the pore former, as long as the pore former becomes pores after the firing, and examples of the pore former include starch, a foamable resin, a water absorbable resin, and silica gel. A content of the pore former is preferably from 10 to 20 parts by mass to 100 parts by mass of the ceramic raw material.

As the surfactant, ethylene glycol, dextrin, fatty acid soap, polyalcohol or the like is usable. One of these surfactants may be used alone, or any combination of two or more of them may be used. A content of the surfactant is preferably from 3 to 20 parts by mass to 100 parts by mass of the ceramic raw material.

A content of the dispersing medium is preferably from 10 to 30 parts by mass to 100 parts by mass of the ceramic raw material.

Particle diameters and a blend amount of the ceramic raw material for use as well as particle diameters and a blend amount of the pore former to be added are adjusted, so that the honeycomb structure having desirable porosity and average pore diameter can be obtained. In the manufacturing method for the honeycomb structure of the present embodiment, the particle diameters and blend amount of the pore former are preferably adjusted so that the porosities of the partition walls and the circumferential wall are both 48% or more.

There is not any special restriction on a method of kneading the forming raw material to form the kneaded material, but an example of the method is a method in which a kneader, a vacuum pugmill or the like is used. The extrusion can be performed by using a die for extrusion in which slits corresponding to a sectional shape of the honeycomb formed body are formed.

(2-2) Formed Body Grinding Step A2:

The formed body grinding step A2 is a step of drying the honeycomb formed body obtained by the honeycomb formed body preparing step A1 and grinding the surface of the circumferential wall of the dried honeycomb formed body. There is not any special restriction on a drying method, but examples of the method include hot air drying, microwave drying, dielectric drying, reduced pressure drying, vacuum drying, and freeze drying. Among these methods, the dielectric drying, the microwave drying or the hot drying is preferably performed alone or any combination of them is preferably performed. Additionally, as drying conditions, the drying is preferably performed at a drying temperature of 30 to 150° C. for drying time of 1 minute to 2 hours. An example of a method of performing the grinding of the surface of the circumferential wall of the honeycomb formed body is a method of rotating the honeycomb formed body and pressing a grindstone onto the circumferential wall. The grinding can be performed by using the grindstone. The grinding is performed preferably in a range of a thickness of 0.1 to 2.0 mm from the surface of the circumferential wall of the honeycomb formed body, further preferably in a thickness range of 0.2 to 1.5 mm, and especially preferably in a thickness range of 0.3 to 1.0 mm.

(2-3) Firing Step A3:

The firing step A3 is a step of firing the honeycomb formed body obtained by grinding the surface of the circumferential wall in the formed body grinding step A2, to obtain the honeycomb structure. A firing temperature can suitably be determined in accordance with a material of the honeycomb formed body. For example, in a case where the material of the honeycomb formed body is cordierite, the firing temperature is preferably from 1380 to 1450° C. and further preferably from 1400 to 1440° C. Additionally, firing time is preferably from 4 to 6 hours as time to keep the highest temperature.

In the honeycomb structure manufactured by the honeycomb formed body preparing step A1, the formed body grinding step A2 and the firing step A3, as compared with a conventional honeycomb structure, a surface roughness in the surface of the circumferential wall is rougher, and a friction coefficient of the surface of the circumferential wall is larger. Consequently, when the honeycomb structure is stored in a can body, shift of the honeycomb structure in the can body can effectively be inhibited even with a holding pressure smaller than before.

(3) Manufacturing Method 2 for Honeycomb Structure:

Next, another embodiment of the manufacturing method for the honeycomb structure of the present invention will be described. The manufacturing method for the honeycomb structure of the present embodiment includes a honeycomb formed body preparing step B1, a firing step B2, and a fired body grinding step B3 which will be mentioned below.

(3-1) Honeycomb Formed Body Preparing Step B1:

The honeycomb formed body preparing step B1 is a step of extruding a kneaded material obtained by kneading a forming raw material in the form of a honeycomb to obtain a honeycomb formed body. The honeycomb formed body has partition walls defining cells which extend from a first end face to a second end face, and a circumferential wall formed to surround an outermost circumference of the partition walls. The honeycomb formed body preparing step B1 is preferably a step similar to the honeycomb formed body preparing step A1 described hitherto.

(3-2) Firing Step B2:

The firing step B2 is a step of firing the honeycomb formed body obtained by the honeycomb formed body preparing step B1 to obtain a honeycomb fired body. The firing step B2 is preferably a step similar to the firing step A3 described hitherto, except that the honeycomb formed body obtained by the honeycomb formed body preparing step B1 is fired.

(3-3) Fired Body Grinding Step B3:

The fired body grinding step B3 is a step of grinding the surface of a circumferential wall of the honeycomb fired body obtained by the firing step B2. An example of a method of performing the grinding of the surface of the circumferential wall of the honeycomb fired body is a method of rotating the honeycomb fired body and pressing a grindstone onto the circumferential wall. The grinding can be performed by using the grindstone sprinkled with diamond. The grinding is performed preferably in a range of a thickness of 0.1 to 2.0 mm from the surface of the circumferential wall of the honeycomb fired body, further preferably in a thickness range of 0.2 to 1.5 mm, and especially preferably in a thickness range of 0.3 to 1.0 mm.

In the honeycomb structure manufactured by the honeycomb formed body preparing step B1, the firing step B2 and the fired body grinding step B3, as compared with a conventional honeycomb structure, a surface roughness in the surface of the circumferential wall is rougher, and a friction coefficient of the surface of the circumferential wall is larger. Consequently, when the honeycomb structure is stored in a can body, shift of the honeycomb structure in the can body can effectively be inhibited even with a holding pressure smaller than before.

(4) Manufacturing Method 3 for Honeycomb Structure:

Next, still another embodiment of the manufacturing method for the honeycomb structure of the present invention will be described. As to the manufacturing method for the honeycomb structure of the present embodiment, in a step of extruding a kneaded material obtained by kneading a forming raw material in the form of a honeycomb to obtain a honeycomb formed body, such a forming raw material as mentioned below is used.

The forming raw material is obtained by adding a dispersing medium and an additive to a ceramic raw material. Further, the ceramic raw material is a raw material to form the partition walls and the circumferential wall by firing. In the manufacturing method for the honeycomb structure of the present embodiment, a material in which an amount of kaolin to an amount of alumina, talc and kaolin is decreased is used as the ceramic raw material. Specifically, it is preferable to use a material which does not include kaolin, or a material in which the amount of kaolin is 10 parts by mass or less to 100 parts by mass of the ceramic raw material in a case where kaolin is included.

Additionally, in the manufacturing method for the honeycomb structure of the present embodiment, as the ceramic raw material, a material including alumina of coarse particles may be used. The alumina of the coarse particles means alumina having an average particle diameter of 3 to 5 μm. Further, as the ceramic raw material, a material including 20 to 30 parts by mass of alumina of the coarse particles to 100 parts by mass of the ceramic raw material is preferably used.

When the extrusion is performed by using the kneaded material obtained by kneading the forming raw material in which the ceramic raw material including the decreased amount of kaolin or the ceramic raw material including alumina of the coarse particles is used, a portion in which the ceramic raw material becomes sparse is present in the surface of the formed body. For example, in a case where the ceramic raw material of the forming raw material includes a lot of alumina of the coarse particles, the ceramic raw material is hard to be charged into a periphery of a pore former in the forming raw material, and a fine network is hard to be formed by the ceramic raw material. Especially, in a case where porosities of the partition walls and the circumferential wall are both 48% or more, a porosity in the surface of the circumferential wall is higher than a porosity of an inner surface of the circumferential wall, and hence a friction coefficient of the surface of the circumferential wall can suitably improve.

In the manufacturing method for the honeycomb structure of the present embodiment, the honeycomb formed body is obtained by using the hitherto described forming raw material, and then the obtained honeycomb formed body is fired, so that the honeycomb structure can be manufactured. Additionally, the obtained honeycomb formed body may be subjected to the formed body grinding step A2 mentioned above. In addition, the honeycomb fired body obtained by firing the honeycomb formed body may be subjected to the fired body grinding step B3 mentioned above.

(5) Canning Structure:

Next, a first embodiment of a canning structure of the present invention will be described. The canning structure of the present embodiment includes the hitherto described honeycomb structure of the present invention, a can body which stores this honeycomb structure, and a cushioning member interposed between the honeycomb structure and the can body. Here, FIG. 10 is a cross-sectional view schematically showing a cross section of the first embodiment of the canning structure of the present invention which is parallel to a cell extending direction of the honeycomb structure.

Figure 10:
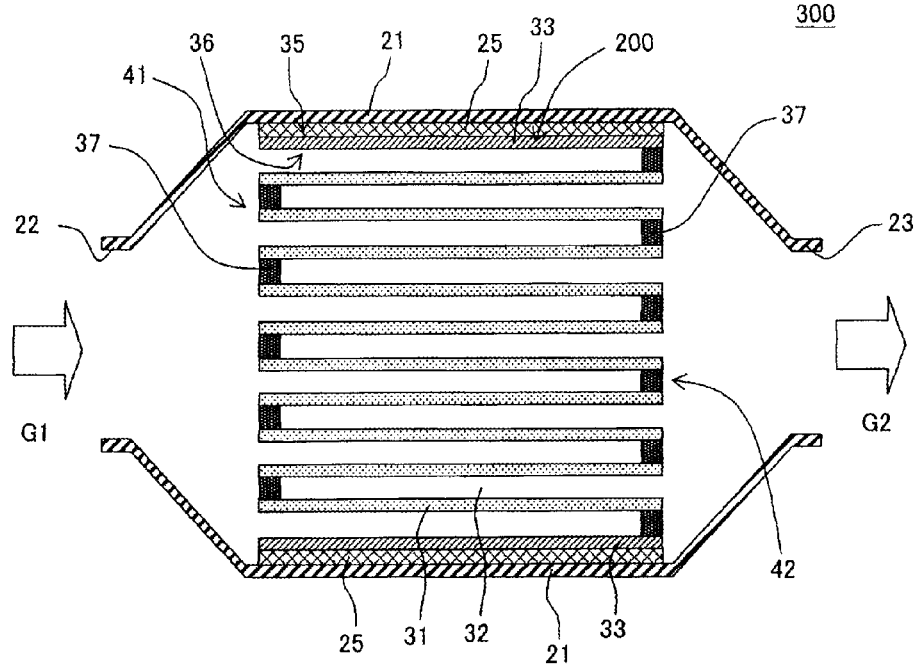
FIG. 10 is a cross-sectional view schematically showing a cross section of a first embodiment of a canning structure of the present invention which is parallel to a cell extending direction of a honeycomb structure.

A canning structure 300 shown in FIG. 10 includes the honeycomb structure 200 of the second embodiment shown in FIG. 8 and FIG. 9. The canning structure 300 shown in FIG. 10 includes the honeycomb structure 200, a can body 21 which stores the honeycomb structure 200, and a cushioning member 25 interposed between the honeycomb structure 200 and the can body 21. Further, in the canning structure 300, in a direction orthogonal to an extending direction of the cells 32 of the honeycomb structure 200, a holding pressure to be applied to the circumferential wall 33 of the honeycomb structure 200 is 1.0 MPa or more and 2.0 MPa or less. The honeycomb structure 200 is constituted to increase a friction coefficient of the surface 35 of the circumferential wall 33 as described hitherto. Therefore, even when the holding pressure has a small value of 0.2 MPa or more and 2.0 MPa or less in a case where the circumferential wall 33 is held by the cushioning member 25, movement of the honeycomb structure 200 in the extending direction of the cells 32 can effectively be inhibited. That is, the canning structure 300 of the present embodiment can effectively inhibit the movement of the honeycomb structure 200 in the extending direction of the cells 32 even with the small holding pressure in a case where an exhaust gas G1 flows through the can body 21. In FIG. 10, reference numeral 36 is an inner surface of the circumferential wall 33. In FIG. 10, reference numeral 37 is a plugging member.

Additionally, in the canning structure 300 of the present embodiment, the partition walls 31 and the circumferential wall 33 of the honeycomb structure 200 are integrally formed, the canning structure is therefore excellent in thermal shock resistance, and hence even in a situation where a high-temperature exhaust gas flows, the partition walls 31 and the circumferential wall 33 are hard to be damaged. That is, a circumferential coating material is not used in the circumferential wall 33, and hence the canning structure is excellent in thermal shock resistance. Additionally, in the honeycomb structure 200, the porosities of the partition walls 31 and the circumferential wall 33 are both 48% or more, and decrease of a pressure loss is achieved. Furthermore, in a case where the honeycomb structure 200 is used as a catalyst loading filter, an amount of a catalyst to be loaded per unit volume can be increased. For example, in a case where the catalyst is applied into the partition walls, the pressure loss is further decreased. Furthermore, a heat capacity of the honeycomb structure is small, and hence the time required to activate the catalyst can be shortened.

In the canning structure of the present embodiment, the holding pressure to be applied to the circumferential wall is preferably 0.2 MPa or more and 1.0 MPa or less and further preferably 0.2 MPa or more and 0.7 MPa or less. The holding pressure is a value obtained by measuring the pressure to be applied to the circumferential wall of the honeycomb structure at room temperature of 25° C. by a thin sensor sheet. Specifically, the holding pressure can be measured by the following method. The honeycomb structure around which a tactile sensor is wound is stored in the can body to prepare the canning structure, and the pressure to be applied to the circumferential wall of the honeycomb structure is measured from the pressure read with the tactile sensor.

The can body 21 is a tubular structure which has an inflow port 22 into which the exhaust gas G1 flows and an outflow port 23 from which a purified exhaust gas G2 flows outside, and in which the honeycomb structure 200 is stored. The honeycomb structure 200 is preferably disposed in the can body 21 so that, for example, the first end face 41 is directed on an inflow port 22 side of the can body 21 and the second end face 42 is directed on an outflow port 23 side of the can body 21.

There is not any special restriction on a material of the cushioning member 25, but a non-expansible ceramic fiber mat, a thermally expansible mineral material mat or the like is preferable. There is not any special restriction on the material of the cushioning member, as long as movement of the honeycomb structure 200 in an extending direction of the cells 32 can be inhibited. A friction coefficient of the surface 35 of the circumferential wall 33 of the honeycomb structure 200 increases, the cushioning member 25 made of the abovementioned material is used, and hence the movement of the honeycomb structure 200 in the extending direction of the cells 32 can effectively be inhibited even with a small holding pressure.

The honeycomb structure 200 around which the cushioning member 25 is wound to cover the circumferential wall 33 is preferably press-fitted into the can body 21. When the honeycomb structure 200 is stored in such a state, the honeycomb structure 200 can be prevented from being moved in the can body 21, and stabilized in the can body 21. In consequence, the honeycomb structure 200 can further effectively be prevented from being damaged.

EXAMPLES

Example 1

To 100 parts by mass of a cordierite forming raw material, there were added 13 parts by mass of a pore former, 35 parts by mass of a dispersing medium, 6 parts by mass of an organic binder and 0.5 part by mass of a dispersing agent, respectively, followed by mixing and kneading, to prepare a kneaded material. As the cordierite forming raw material, there were used alumina, aluminum hydroxide, kaolin, talc and silica. Water was used as the dispersing medium, cokes having an average particle diameter of 1 to 10 µm were used as the pore former, hydroxypropyl methylcellulose was used as the organic binder, and ethylene glycol was used as the dispersing agent. Particle diameters and an amount of the pore former were controlled, thereby controlling pore diameters and a porosity of partition walls.

Next, the kneaded material was extruded by using a predetermined die, and a honeycomb formed body was obtained in which a cell shape was quadrangular and the whole shape was a round pillar shape.

Next, the honeycomb formed body was dried with a microwave dryer and further completely dried with a hot air dryer, and then both end faces of the honeycomb formed body were cut to adjust the honeycomb formed body into a predetermined dimension. Further, the honeycomb formed body was dried with the hot air dryer, and further fired at 1410 to 1440° C. for 5 hours, to obtain a honeycomb fired body.

Next, a surface of a circumferential wall of the honeycomb fired body was ground as much as 1.0 mm to prepare a honeycomb structure of Example 1. The grinding was carried out by using a lathe.

The obtained honeycomb structure had a round pillar shape in which a diameter of a cross section of the honeycomb structure which was orthogonal to a cell extending direction of the honeycomb structure was 118.4 mm and a length of the honeycomb structure in the cell extending direction was 127.3 mm. A thickness of partition walls was 216 µm, and a cell density was 47 cells/cm$^2$. A shape of cells was quadrangular. A thickness of a circumferential wall was 0.7 mm. Table 1 shows "the thickness (µm) of the partition walls", "the cell density (cells/cm$^2$)", and "the thickness (mm) of the circumferential wall".

As to the obtained honeycomb structure, "a porosity of the partition walls", "a porosity of the circumferential wall", "a porosity P1 in the surface of the circumferential wall", "a porosity P2 of an inner surface of the circumferential wall" and "an average pore diameter in the surface of the circumferential wall" were measured by the following methods. Table 1 shows the measurement results. Additionally, Table 1 shows an outer diameter dimensional difference (mm) of the obtained honeycomb structure. The outer diameter dimensional difference is a difference between a maximum outer diameter dimension and a minimum outer diameter dimension of the obtained honeycomb structure.

(Porosity of Partition Walls and Porosity of Circumferential Wall)

The porosities of the partition walls and the circumferential wall were measured with a mercury porosimeter.

(Porosity P1 in Surface of Circumferential Wall)

SEM photographs of the surface of the circumferential wall of the honeycomb structure were photographed in three view fields by a scanning electron microscope (SEM). A size of one of the photographed view fields was set to 1.3 mm×1.0 mm. Next, each photographed image was binarized by image analysis, and divided into a hollow portion (i.e., a pore portion) and a portion other than hollows. Next, ratios to be occupied by the hollow portions in the respective images of three view fields were calculated, and an average value of the ratios was obtained. The obtained average value was defined as the porosity P1 in the surface of the circumferential wall.

(Porosity P2 in Inner Surface of Circumferential Wall)

When the porosity P2 in the inner surface of the circumferential wall was measured, an outer wall peripheral portion was cut from the honeycomb structure, the partition walls which came in contact with the circumferential wall were removed to expose the inner surface of the circumferential wall, and then SEM photographs of the inner surface of the circumferential wall of the honeycomb structure were photographed in three view fields by the scanning electron microscope (SEM). A size of one of the photographed view fields was set to 1.3 mm×1.0 mm. Next, each photographed image was binarized by the image analysis, and divided into a hollow portion (i.e., a pore portion) and a portion other than hollows. Next, ratios to be occupied by the hollow portions in the respective images of three view fields were calculated, and an average value of the ratios was obtained. However, portions which came in contact with the partition walls when the ratios were calculated were excluded. The obtained average value was defined as the porosity P2 in the inner surface of the circumferential wall.

(Average Pore Diameter in Surface of Circumferential Wall)

The SEM photographs of the surface of the circumferential wall of the honeycomb structure were photographed in three view fields by the scanning electron microscope (SEM). The size of one of the photographed view fields was set to 1.3 mm×1.0 mm. Next, each photographed image was binarized by the image analysis, and divided into a hollow portion (i.e., a pore portion) and a portion other than hollows. Next, sizes of the hollow portions in the respective images of the three view fields, i.e., diameters of circles drawn to be inscribed in the hollow portions were measured, and an average value was obtained. The obtained average value was defined as the average pore diameter in the surface of the circumferential wall.

Next, the obtained honeycomb structure was stored in a can body. Between the honeycomb structure and the can body, there was interposed a cushioning member constituted of a non-expansible ceramic mat (trade name: MAFTEC) manufactured by Mitsubishi Plastics, Inc. In Example 1, adjustment was made so that a holding pressure to be applied to the circumferential wall of the honeycomb structure was 0.2 MPa. The holding pressure to be applied to the circumferential wall of the honeycomb structure was a value measured at room temperature of 25° C. with a tactile sensor (a thickness of about 0.1 mm) manufactured by NITTA Corporation. Table 2 shows "the holding pressure" to be applied to the circumferential wall.

TABLE 2

| | Circumferential wall | Holding pressure (MPa) | Shift test of honeycomb structure | Thermal shock resistance test | General evaluation |
|---|---|---|---|---|---|
| Example 1 | Integral | 0.2 | None | A | Excellent |
| Example 2 | Integral | 0.2 | None | B | Good |
| Example 3 | Integral | 0.2 | None | A | Excellent |
| Example 4 | Integral | 0.2 | None | A | Excellent |
| Example 5 | Integral | 0.2 | None | B | Good |
| Comparative Example 1 | Integral | 0.2 | Present | A | Failure |
| Comparative Example 2 | Integral | 0.2 | Present | A | Failure |
| Comparative Example 3 | Circumferential coating | 0.2 | None | C | Failure |

TABLE 1

| | Thickness (μm) of partition walls | Cell density (cells/cm$^2$) | Thickness (mm) of circumferential wall | Porosity (%) of partition walls | Porosity (%) of circumferential wall | Porosity P1 (%) in surface of circumferential wall | Porosity P2 (%) in inner portion of circumferential wall | Ave. pore dia. (μm) in surface of circumferential wall | Outer shape dimensional difference (mm) of surface of circumferential wall |
|---|---|---|---|---|---|---|---|---|---|
| Example 1 | 216 | 47 | 0.7 | 63 | 63 | 61 | 55 | 19 | 0.06 |
| Example 2 | 305 | 47 | 1.2 | 75 | 75 | 71 | 58 | 23 | 0.05 |
| Example 3 | 153 | 34 | 0.5 | 48 | 48 | 45 | 36 | 12 | 0.06 |
| Example 4 | 203 | 31 | 0.5 | 55 | 55 | 50 | 39 | 14 | 0.13 |
| Example 5 | 216 | 47 | 1.1 | 65 | 65 | 62 | 47 | 20 | 0.08 |
| Comparative Example 1 | 153 | 34 | 0.4 | 47 | 47 | 40 | 37 | 12 | 0.07 |
| Comparative Example 2 | 153 | 34 | 0.4 | 30 | 30 | 30 | 28 | 11 | 0.06 |
| Comparative Example 3 | 216 | 47 | 1.8 | 63 | 63 | — | — | — | 0.35 |
| Comparative Example 4 | 305 | 47 | 1.8 | 75 | 75 | — | — | — | 0.4 |
| Comparative Example 5 | 153 | 34 | 1.8 | 48 | 48 | — | — | — | 0.42 |
| Comparative Example 6 | 216 | 47 | 0.7 | 63 | 63 | 55 | 55 | 10 | 1.7 |
| Comparative Example 7 | 153 | 34 | 0.5 | 48 | 48 | 36 | 36 | 10 | 1.1 |
| Example 6 | 216 | 47 | 0.7 | 63 | 63 | 62 | 57 | 30 | 0.05 |
| Example 7 | 153 | 34 | 0.4 | 48 | 48 | 45 | 36 | 10 | 0.06 |
| Comparative Example 8 | 203 | 31 | 0.5 | 55 | 55 | 40 | 38 | 9 | 0.9 |
| Comparative Example 9 | 153 | 34 | 0.5 | 48 | 48 | 37 | 36 | 5 | 1.3 |
| Example 8 | 381 | 47 | 1 | 63 | 63 | 61 | 55 | 19 | 0.06 |
| Example 9 | 101 | 62 | 0.5 | 48 | 48 | 45 | 36 | 12 | 0.05 |
| Example 10 | 254 | 47 | 0.8 | 63 | 63 | 61 | 55 | 19 | 0.04 |
| Example 11 | 216 | 47 | 5 | 63 | 63 | 61 | 55 | 19 | 0.05 |
| Example 12 | 216 | 47 | 0.2 | 63 | 63 | 61 | 55 | 19 | 0.06 |
| Example 13 | 216 | 47 | 4 | 63 | 63 | 61 | 55 | 19 | 0.03 |
| Example 14 | 216 | 47 | 3 | 63 | 63 | 61 | 55 | 19 | 0.03 |

TABLE 2-continued

| | Circumferential wall | Holding pressure (MPa) | Shift test of honeycomb structure | Thermal shock resistance test | General evaluation |
|---|---|---|---|---|---|
| Comparative Example 4 | Circumferential coating | 0.2 | None | C | Failure |
| Comparative Example 5 | Circumferential coating | 0.2 | None | C | Failure |
| Comparative Example 6 | Integral | 0.2 | Present | B | Failure |
| Comparative Example 7 | Integral | 0.2 | Present | A | Failure |
| Example 6 | Integral | 0.2 | None | B | Good |
| Example 7 | Integral | 0.2 | None | A | Excellent |
| Comparative Example 8 | Integral | 0.2 | Present | A | Failure |
| Comparative Example 9 | Integral | 0.2 | Present | A | Failure |
| Example 8 | Integral | 0.2 | None | A | Excellent |
| Example 9 | Integral | 0.2 | None | B | Good |
| Example 10 | Integral | 0.2 | None | A | Excellent |
| Example 11 | Integral | 0.2 | None | A | Excellent |
| Example 12 | Integral | 0.2 | None | A | Excellent |
| Example 13 | Integral | 0.2 | None | A | Excellent |
| Example 14 | Integral | 0.2 | None | A | Excellent |

As to the obtained honeycomb structure, "a shift test of the honeycomb structure" and "a thermal shock resistance test" were carried out by the following method. Table 2 shows the results. Additionally, on the basis of the results of "the shift test of the honeycomb structure" and "the thermal shock resistance test", "a general evaluation" was carried out. Table 2 shows the results.

(Shift Test of Honeycomb Structure)

The honeycomb structure stored in the can body was installed in an excitation testing machine to carry out a vibration test of the honeycomb structure. As vibrating conditions in the vibration test, the test was carried out at an acceleration of 30 G and a frequency of 100 Hz. Additionally, the vibration test was carried out for 30 hours, in which the honeycomb structure was vibrated in a gas flow direction on the above vibrating conditions. A gas discharged from a gas burner was passed through the can body. In the vibration test, a temperature of the center of an upstream of 10 mm from an inlet end face of the honeycomb structure was 700° C. After this vibration test, a state of the honeycomb structure stored in the can body was confirmed. A case where the honeycomb structure moved in a gas passing direction in the can body was evaluated as "present". Additionally, a case where the honeycomb structure did not move in the gas passing direction in the can body was evaluated as "none".

(Thermal Shock Resistance Test)

In a thermal shock resistance test, the honeycomb structure stored in the can body (a canning structure) was first attached to a burner testing machine. The burner testing machine has a pipe which simulates an exhaust pipe, and can supply heated air through the pipe to the canning structure. By this burner testing machine, the following operation was performed. First, the heated air at a temperature of 670° C. flowed inside at a flow velocity of 1.0±0.15 Nm$^3$/min for 5 minutes. Hereinafter, a step in which the heated air flows inside will be referred to as "the heating step" sometimes. Next, air at room temperature flowed inside at a flow velocity of 1.0±0.15 Nm$^3$/min for 5 minutes. Hereinafter, a step in which the air at room temperature flows inside will be referred to as "the cooling step" sometimes. One heating step and one cooling step were defined as one cycle. On conditions that the heated air was at a temperature of 670° C., the heating steps and the cooling steps were carried out as much as 10 cycles. Subsequently, the temperature of the heated air to flow inside in the heating step was raised as much as 50° C., and the heating steps and the cooling steps were carried out as much as 10 cycles. Afterward, the temperature of the heated air which flowed inside in the heating step was raised to 720° C., 770° C., 820° C., 870° C., 920° C., 970° C., 1020° C., 1070° C. and 1120° C. in stages (i.e., not incrementally), and 10 cycles were carried out at each temperature. In the heating step or the cooling step, when the honeycomb structure was damaged or cracked, the thermal shock resistance test was ended. It was judged whether or not cracks were generated by judging generation of cracking sound or visually observing an appearance of the honeycomb structure. The temperature of the heated air in the case where the honeycomb structure was damaged or cracked was defined as a durability upper limit temperature (° C.) of the honeycomb structure. In the thermal shock resistance test, judgments of A to C were carried out from the measured value of the durability upper limit temperature on the basis of the following evaluation standards.

Evaluation "A": A case where the durability upper limit temperature was 1020° C. or more was defined as the evaluation "A".

Evaluation "B": A case where the durability upper limit temperature was 820° C. or more and lower than 1020° C. was defined as the evaluation "B".

Evaluation "C": A case where the durability upper limit temperature was lower than 820° C. was defined as the evaluation "C".

(General Evaluation)

From the result of "the shift test of the honeycomb structure" and the result of "the thermal shock resistance test", general evaluations of excellent, good and failure were carried out in accordance with the following evaluation standards.

Evaluation "excellent": A case where the result of the shift test of the honeycomb structure was "none" and the result of the thermal shock resistance test was "A" was defined as the evaluation "excellent".

Evaluation "good": A case where the result of the shift test of the honeycomb structure was "none" and the result of the thermal shock resistance test was "B" was defined as the evaluation "good".

Evaluation "failure": A case where the result of the shift test of the honeycomb structure was "present" or the result of the thermal shock resistance test was "C" was defined as the evaluation "failure".

Examples 2 to 14

In Examples 2 to 14, the procedure of Example 1 was repeated except that a thickness (m) of partition walls, a cell density (cells/cm$^2$), a thickness (mm) of a circumferential wall, a porosity (%) of the partition walls and a porosity (%) of the circumferential wall were changed as shown in Table 1, to manufacture honeycomb structures. In Examples 2 to 14, the porosity (%) of the partition walls and the porosity (%) of the circumferential wall were adjusted by changing a size of a pore former for use and an amount of the pore former to be added.

Comparative Examples 1 and 2

In Comparative Examples 1 and 2, the procedure of Example 1 was repeated except that a thickness (μm) of partition walls, a cell density (cells/cm²), a thickness (mm) of a circumferential wall, a porosity (%) of the partition walls and a porosity (%) of the circumferential wall were changed as shown in Table 1, to manufacture honeycomb structures. In Comparative Examples 1 and 2, the porosity (%) of the partition walls and the porosity (%) of the circumferential wall were adjusted by changing a size of a pore former for use and an amount of the pore former to be added.

Comparative Examples 3 to 5

In Comparative Examples 3 to 5, honeycomb structures were first prepared by methods similar to those for the honeycomb structures of Examples 1 to 3. Afterward, a circumferential wall of each obtained honeycomb structure was ground and removed, and a circumferential coating material was applied to a circumference of the ground honeycomb structure, followed by drying, to prepare the circumferential wall made of the circumferential coating material.

Comparative Examples 6 and 7

In Comparative Examples 6 and 7, honeycomb structures were prepared by methods similar to those for the honeycomb structures of Examples 1 and 3, except that each honeycomb structure was manufactured without grinding a surface of a circumferential wall of a honeycomb fired body.

Comparative Examples 8 and 9

In Comparative Examples 8 and 9, honeycomb structures were prepared by methods similar to those for the honeycomb structures of Examples 4 and 3, except that a pore former was not added to each kneaded material to form a honeycomb formed body and a grain size of a cordierite forming raw material was adjusted. In Comparative Examples 8 and 9, an average pore diameter (μm) in a surface of a circumferential wall was adjusted by adjusting the grain size of the cordierite forming raw material.

As to the honeycomb structures of Examples 2 to 14 and the honeycomb structures of Comparative Examples 1 to 9, "a shift test of the honeycomb structure" and "a thermal shock resistance test" were carried out by methods similar to those of Example 1. Table 2 shows the results. Additionally, on the basis of the results of "the shift test of the honeycomb structure" and "the thermal shock resistance test", "a general evaluation" was carried out. Table 2 shows the results.

(Result)

As shown in Table 2, in each of the honeycomb structures of Examples 1 to 14, it was possible to obtain excellent results in both of "the shift test of the honeycomb structure" and "the thermal shock resistance test". On the other hand, as to each of the honeycomb structures of Comparative Examples 1, 2 and 6 to 9, the honeycomb structure moved in a passing direction of a gas in a can body. In consequence, each of the honeycomb structures of Comparative Examples 1, 2 and 6 to 9 had the result of failure in the general evaluation. In each of the honeycomb structures of Comparative Examples 1 and 2, porosities of partition walls and a circumferential wall were both smaller than 48%, and hence a significant difference was not obtainable between a porosity P1 in a surface of the circumferential wall and a porosity P2 of an inner surface of the circumferential wall. In the honeycomb structures of Comparative Examples 6 and 7, the porosity P1 in the surface of the circumferential wall and the porosity P2 of the inner surface of the circumferential wall had the same value. In each of the honeycomb structures of Comparative Examples 8 and 9, a value of the average pore diameter (μm) in the surface of the circumferential wall was smaller than 10 μm.

Additionally, in the honeycomb structures of Comparative Examples 3 to 5, the durability upper limit temperature was lower than 820° C., and the result of the thermal shock resistance test was "C". In consequence, each of the honeycomb structures of Comparative Examples 3 to 5 had the result of failure in the general evaluation. From the above-mentioned results, it has been found that each of the honeycomb structures of Examples 1 to 14 has a high thermal shock resistance and can effectively inhibit shift of the honeycomb structure in the can body for use in a case where the honeycomb structure is used as a filter.

A honeycomb structure of the present invention is utilizable as a filter or a catalyst carrier for exhaust gas purification.

DESCRIPTION OF REFERENCE NUMERALS 1 and 31: partition wall, 2, 32, 32a and 32b: cell, 3, 3A and 33: circumferential wall, 3a: exterior covering portion, 5 and 35: surface (the surface of the circumferential wall), 5': surface (the surface of the circumferential wall before grinding is performed), 6 and 36: inner surface (the inner surface of the circumferential wall), 11 and 41: first end face, 12 and 42: second end face, 13: pores, 21: can body, 22: inflow port, 23: outflow port, 25: cushioning member, 37: plugging member, 100 and 200: honeycomb structure, 300: canning structure, 403: circumferential wall, 405: surface (the surface of the circumferential wall), 406: inner surface (the inner surface of the circumferential wall), 413: pore, G; exhaust gas, G1; exhaust gas, and G2: purified exhaust gas.

What is claimed is:

1. A honeycomb structure comprising:
porous partition walls defining cells which extend from a first end face to a second end face and which become through channels for a fluid; and
a porous circumferential wall integrally formed with the partition walls to surround an outermost circumference of the partition walls,
wherein a thickness of the partition walls is from 101 to 381 μm,
porosities of the partition walls and the circumferential wall are both 48% or more,
a porosity in a surface of the circumferential wall is higher than a porosity of an inner surface of the circumferential wall, and
an average pore diameter in the surface of the circumferential wall is 10 μm or more.

2. The honeycomb structure according to claim 1, wherein a cell density of the cells defined by the partition walls is from 15 to 62 cells/cm².

3. The honeycomb structure according to claim 1, wherein the porosities of the partition walls and the circumferential wall are both from 48 to 75%.

4. The honeycomb structure according to claim 1, wherein the average pore diameter in the surface of the circumferential wall is from 10 to 30 μm.

5. The honeycomb structure according to claim 1, wherein in an end portion of each of the cells on the side of the first end face or the second end face, a plugging member which plugs an open end of the cell is disposed.

6. The honeycomb structure according to claim 1, wherein an outer diameter dimensional difference of the honeycomb structure is within ±0.5 mm.

7. A method of manufacturing the honeycomb structure according to claim 1, comprising:
- a honeycomb formed body preparing step A1 of extruding a kneaded material obtained by kneading a forming raw material in the form of a honeycomb, to obtain a honeycomb formed body having partition walls defining cells which extend from a first end face to a second end face, and a circumferential wall formed to surround an outermost circumference of the partition walls;
- a formed body grinding step A2 of grinding the surface of the circumferential wall of the obtained honeycomb formed body; and
- a firing step A3 of firing the honeycomb formed body in which the surface of the circumferential wall is ground, to obtain the honeycomb structure.

8. A method of manufacturing the honeycomb structure according to claim 1, comprising:
- a honeycomb formed body preparing step B1 of extruding a kneaded material obtained by kneading a forming raw material in the form of a honeycomb, to obtain a honeycomb formed body having partition walls defining cells which extend from a first end face to a second end face, and a circumferential wall formed to surround an outermost circumference of the partition walls;
- a firing step B2 of firing the obtained honeycomb formed body to obtain a honeycomb fired body; and
- a fired body grinding step B3 of grinding the surface of the circumferential wall of the obtained honeycomb fired body.

9. A canning structure comprising:

the honeycomb structure according to claim 1;

a can body which stores the honeycomb structure; and a cushioning member interposed between the honeycomb structure and the can body, wherein in a direction orthogonal to a cell extending direction of the honeycomb structure, a holding pressure to be applied to the circumferential wall is 0.2 MPa or more and 1.0 MPa or less.

* * * * *